United States Patent
Hoffman et al.

(10) Patent No.: US 11,904,249 B2
(45) Date of Patent: Feb. 20, 2024

(54) FOLDING DOG AGILITY TEETER

(71) Applicant: Hoffco International Imports LLC, Lititz, PA (US)

(72) Inventors: Stacey Ann Hoffman, Lititz, PA (US); Andrew Ryan Hoffman, Lititz, PA (US); Chad Eugene Spangler, Hummelstown, PA (US)

(73) Assignee: Hoffco International Imports, LLC, Lititz, PA (US)

( * ) Notice: Subject to any disclaimer, the term of this patent is extended or adjusted under 35 U.S.C. 154(b) by 239 days.

(21) Appl. No.: 17/542,937

(22) Filed: Dec. 6, 2021

(65) Prior Publication Data
US 2023/0173398 A1 Jun. 8, 2023

(51) Int. Cl.
*A63G 11/00* (2006.01)
*A01K 15/02* (2006.01)

(52) U.S. Cl.
CPC ............ *A63G 11/00* (2013.01); *A01K 15/027* (2013.01); *A63G 2200/00* (2013.01)

(58) Field of Classification Search
CPC ...... A63G 11/00; A01K 15/02; A01K 15/027; A01K 15/04

USPC .......................................................... 472/115
See application file for complete search history.

(56) References Cited

U.S. PATENT DOCUMENTS

| 1,273,591 | A | * | 7/1918 | Elzey | A63G 11/00 |
| | | | | | 472/115 |
| 1,865,612 | A | * | 7/1932 | Bustillos | A63G 11/00 |
| | | | | | 472/115 |
| 2016/0089609 | A1 | * | 3/2016 | Hatfield | A63G 11/00 |
| | | | | | 472/112 |

* cited by examiner

*Primary Examiner* — Kien T Nguyen
(74) *Attorney, Agent, or Firm* — Saxton & Stump, LLC

(57) ABSTRACT

A portable, folding dog agility teeter is disclosed. The teeter has two boards which are connected by a hinge. A pair of legs are also hinged. Each board can be reversibly fixed in relation to the hinge so the longitudinal axis of each board is parallel to the other. A fulcrum is formed where the legs attach to the hinge. One of the boards is heavier than the other so the heavier board is touching the ground when no additional load is on the other board. As a dog crosses from one board to the other, the teeter moves so the lighter board touches the ground. When the dog leaves the teeter the heavier board moves to touch the ground, thereby resetting the teeter for repeated use.

2 Claims, 8 Drawing Sheets

FOLDING DOG AGILITY TEETER

FIELD OF THE INVENTION

The subject matter of this application pertains to dog agility equipment. More particularly, the subject matter of this application pertains to a piece of dog agility equipment commonly called a teeter. Even more particularly, the subject matter of this application pertains to folding and easily transported dog agility trainers.

BACKGROUND OF THE INVENTION

Canine agility training is broadly the process of teaching a dog to perform various agility skill tests in succession. Common agility training activities include running through tunnels, weaving through poles, jumping through tires, hurdling, and running over teeters. There are many reasons people have their dogs participate in agility training: it's a competitive sport, it's an excellent exercise for the dogs (and to a lesser extent, their people), and it's simply fun.

Of course, as in just about any enjoyable activity, the fun part is surrounded by the less-fun parts of setting up and tearing down, and agility training is no different.

Dog teeters (a/k/a teeter-totters and seesaws) are essentially longboards balanced over a fulcrum. American Kennel Club competition teeters are 12' long, 12" wide, and 24" high, although several other sizes are available and used for non-AKC events, training, fun, and exercise.

Unlike seesaws found in children's playgrounds, canine teeters are often slightly off-center. In this way a dog can run up the teeter, down the other side as the weight balance shifts, and the tetter resets to its original position after the dog steps off, so the teeter is in place for another run.

Although much of the equipment used to create an agility course can be easily broken down and fit in the back of a car, the size of a teeter's longboard can make set up/tear down and transport very difficult.

SUMMARY OF THE INVENTION

The subject matter of this application addresses the transport issues of dog agility teeters. The disclosed teeter comprises two boards connected with a hinge and a folding fulcrum assembly. One can fold the disclosed teeter in half for storage or carrying. To set up the teeter, a user lays the teeter down, unfolds it, locks the boards into position, and unfolds the fulcrum-assembly before placing the teeter upright. The mass of the two boards is uneven, so one side of the teeter is down unless a sufficient weight is present on the other side.

DETAILED DESCRIPTION

Figure 1:
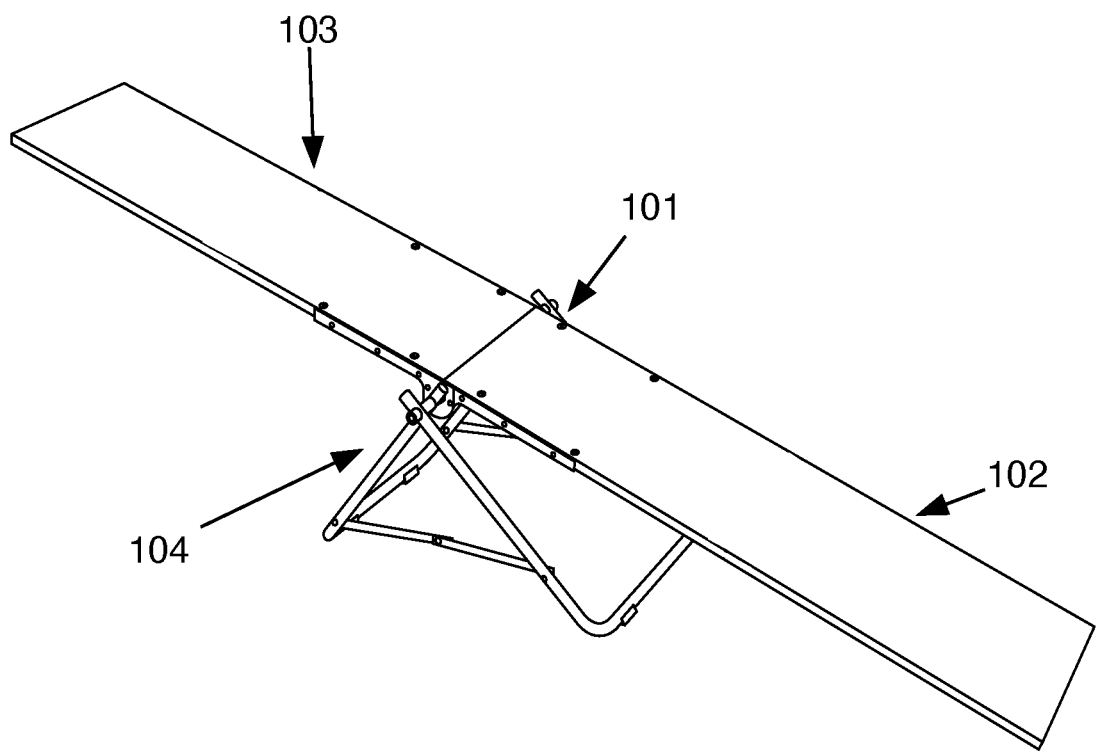
FIG. 1 is an illustration of the teeter in a first position.

The following description and drawings referenced illustrate embodiments of the subject matter of this application. They are not intended to limit the scope of any claim. Those familiar with the art will recognize that other embodiments of the disclosed subject matter are possible. All such alternative embodiments should be considered within the scope of the application's disclosure.

Each reference number consists of three digits. The first digit refers to the drawing in which the referenced aspect is first shown or in which the referenced feature is shown most clearly. Not every referenced feature is called out every time it is shown in a drawing.

In a preferred embodiment of the subject matter of this application, portable dog agility teeter (a "teeter") comprises a platform (101) having a first board (102) and a second board (103), a fulcrum assembly (104), a hinge (301), and a board locking system (501).

The first board comprises a proximal edge (401), a distal edge (201), a topside (203), an underside (403), a width (701), a length (702), a longitudinal axis (703), and a depth (704). The second board also comprises a proximal edge (402), a distal edge (202), a topside (204), an underside (404), a width (705), a length (706), a longitudinal axis (707), and a depth (708).

In most highly preferred embodiments, the mass of the first board is greater than the mass of the second board. In certain of these preferred embodiments, the depth of both boards and the width of both boards are approximately equal, but the length of the first board is slightly greater than the other. This mass discrepancy causes the first board to be in a first position (FIG. 1) when there is no additional load on the second board.

Other preferred embodiments may have first and second boards which are also the approximate same length as each other, but in which the first board further comprises an additional mass that creates the mass discrepancy between the boards. For example, two identical boards may be used to create an uneven teeter if nails are driven into one side or if a weighted block is attached to the underside of one board. Further, an uneven teeter could be made from otherwise identical boards by removing material from one of the boards, for example, by carving one or more channels or grooves on the underside of one board.

The fulcrum assembly comprises a first leg (302), a second leg (303), and at least one stabilizer (304). Each leg has two attachment points (502, 305) each on opposite sides of the boards. In a highly preferred embodiment, these said attachment points are holes which pass through the leg.

Figure 4:
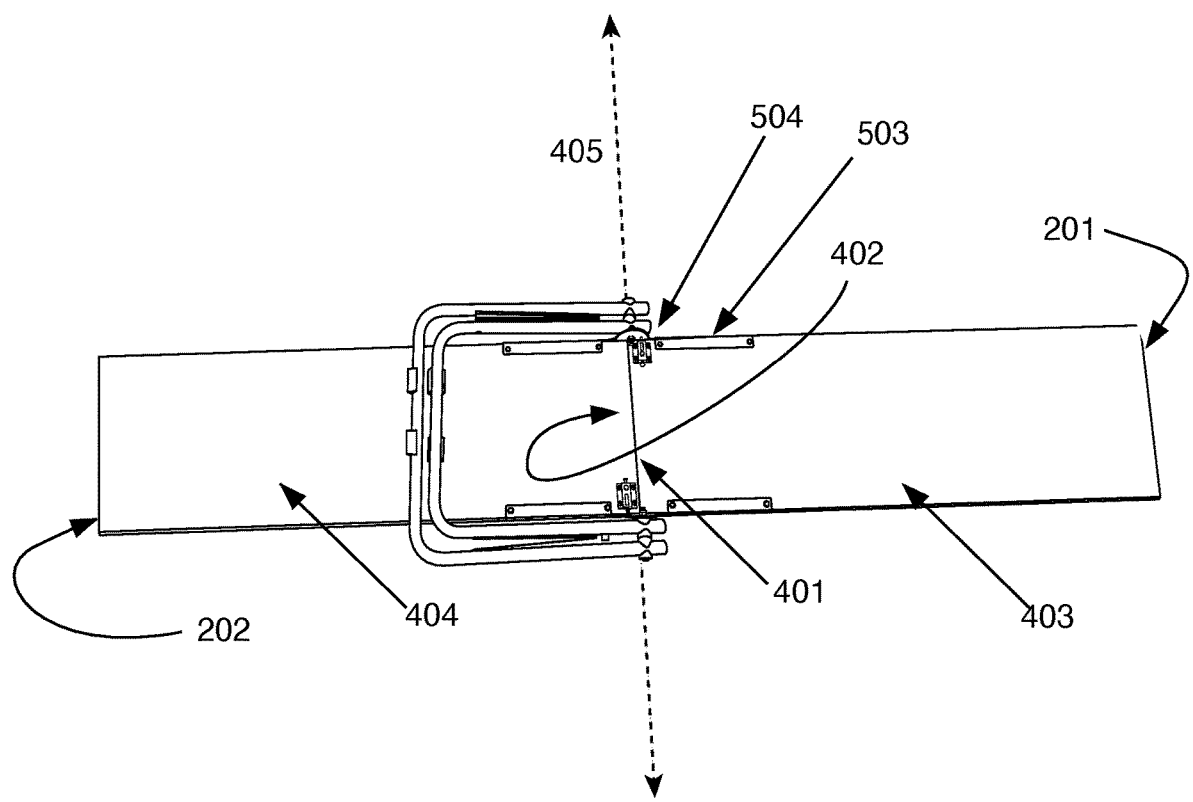
FIG. 4 is another illustration of the underside of the teeter.
Figure 5:
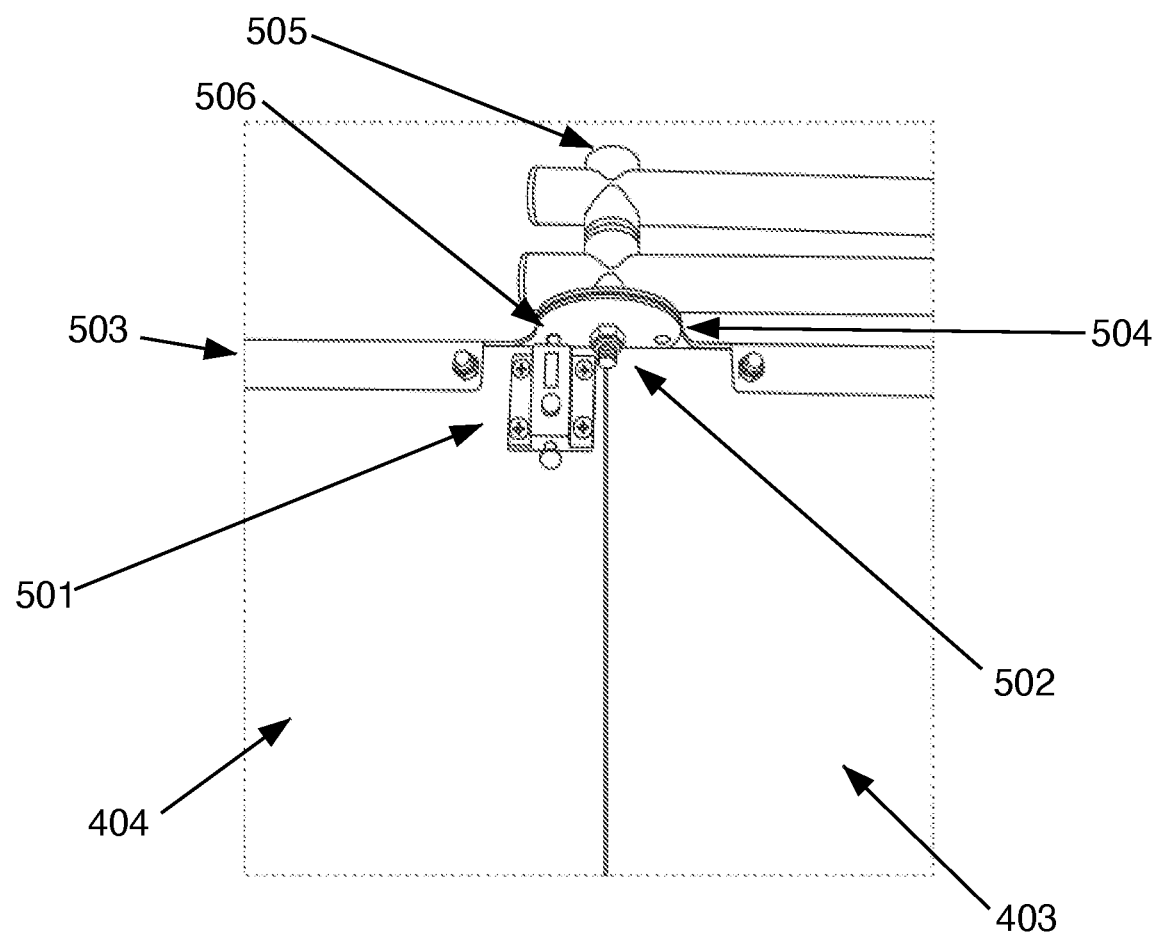
FIG. 5 is an illustration of the locking apparatus of the teeter.

In the interest of clarity, one fulcrum-assembly on one side of the boards and the associated structures is described. A fulcrum-assembly further comprises a first support (306) and a second support (307). Each said support has a brace section (e.g. 503) and an axial section (e.g. 504). The brace section of the first support is attached to the first board near the proximal edge of said board. The brace section of the second support is attached to the second board near the proximal edge of said board. The first and second supports are mirrored and shown at 308 and 309 but not further described here. The supports are best shown in FIG. 5, but again, are mirrored on the opposite side of the boards as shown in FIG. 4. The first support of the fulcrum-assembly and the second support of the fulcrum-assembly are paired and partially overlap.

Figure 2:
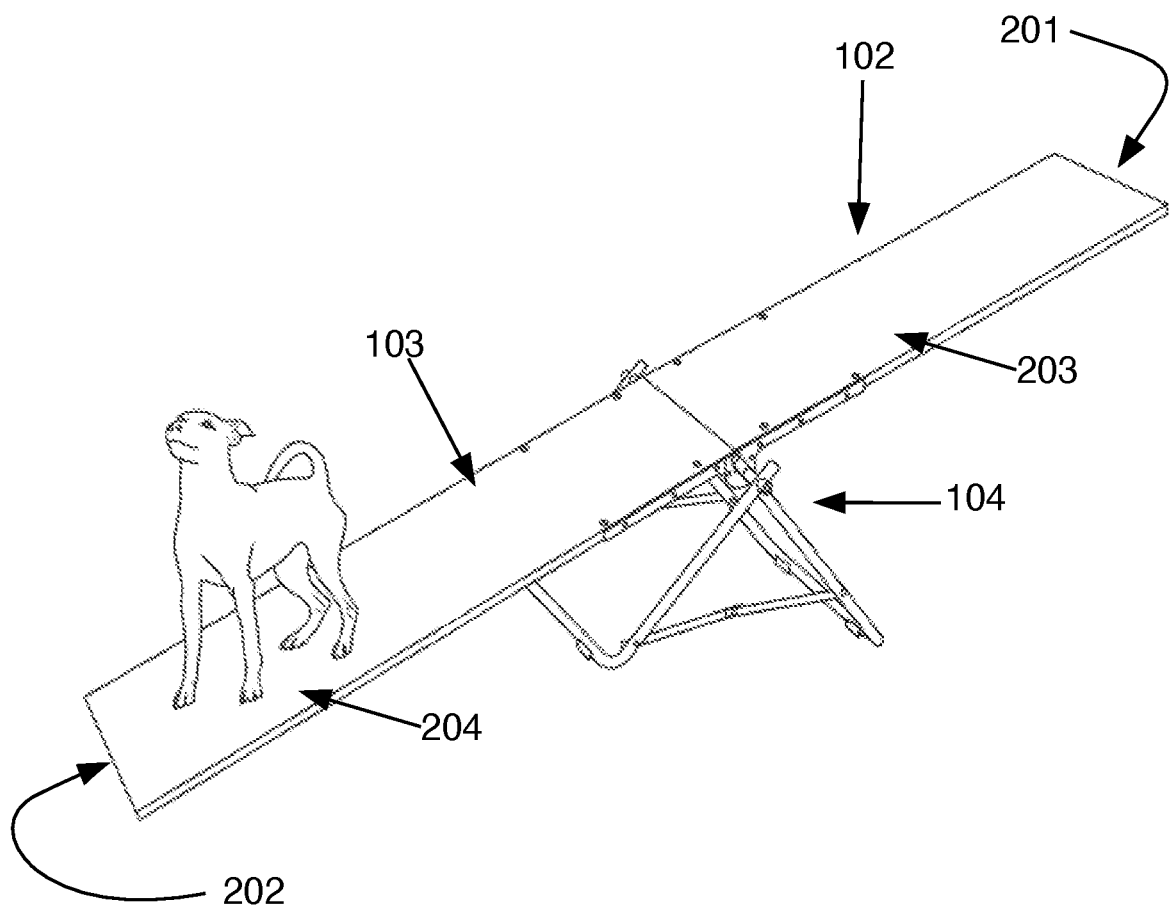
FIG. 2 is an illustration of the teeter in a second position.
Figure 3:
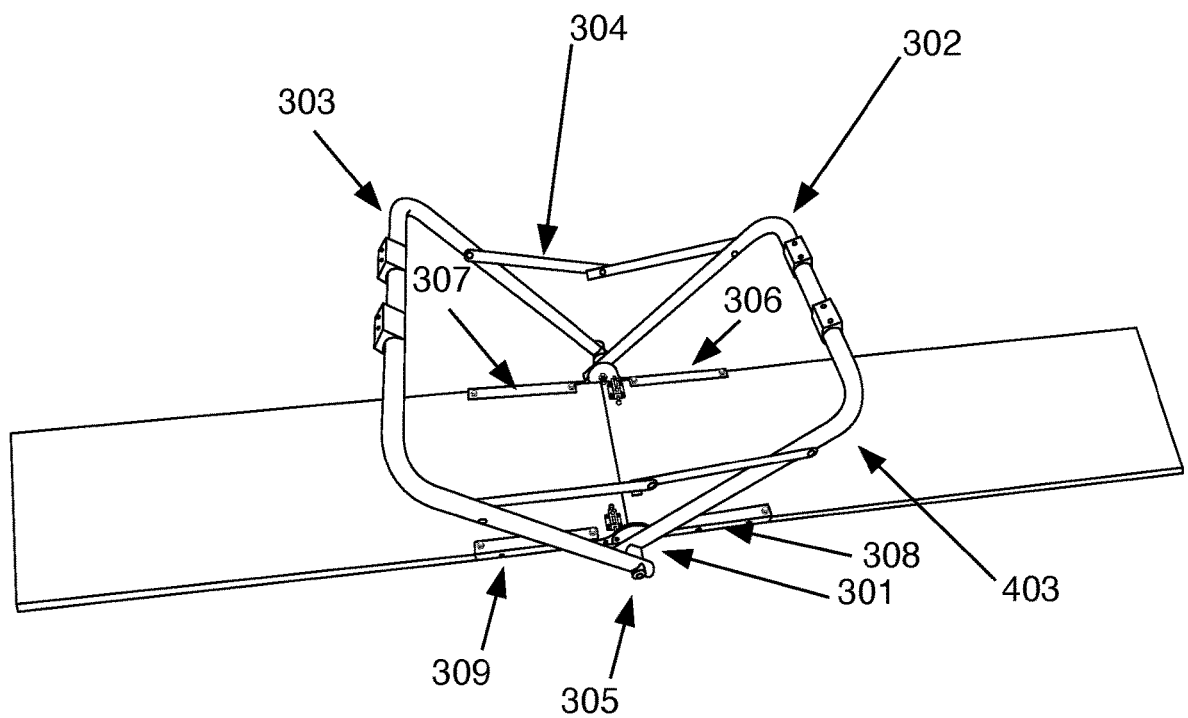
FIG. 3 is an illustration of the underside of the teeter.
Figure 6:
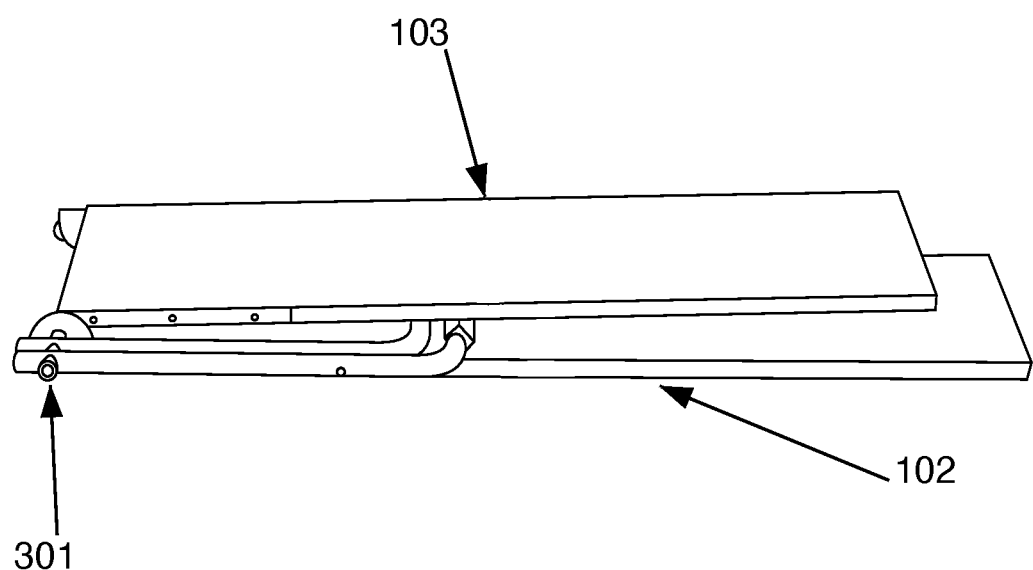
FIG. 6 is an illustration of a folded teeter.
Figure 7:
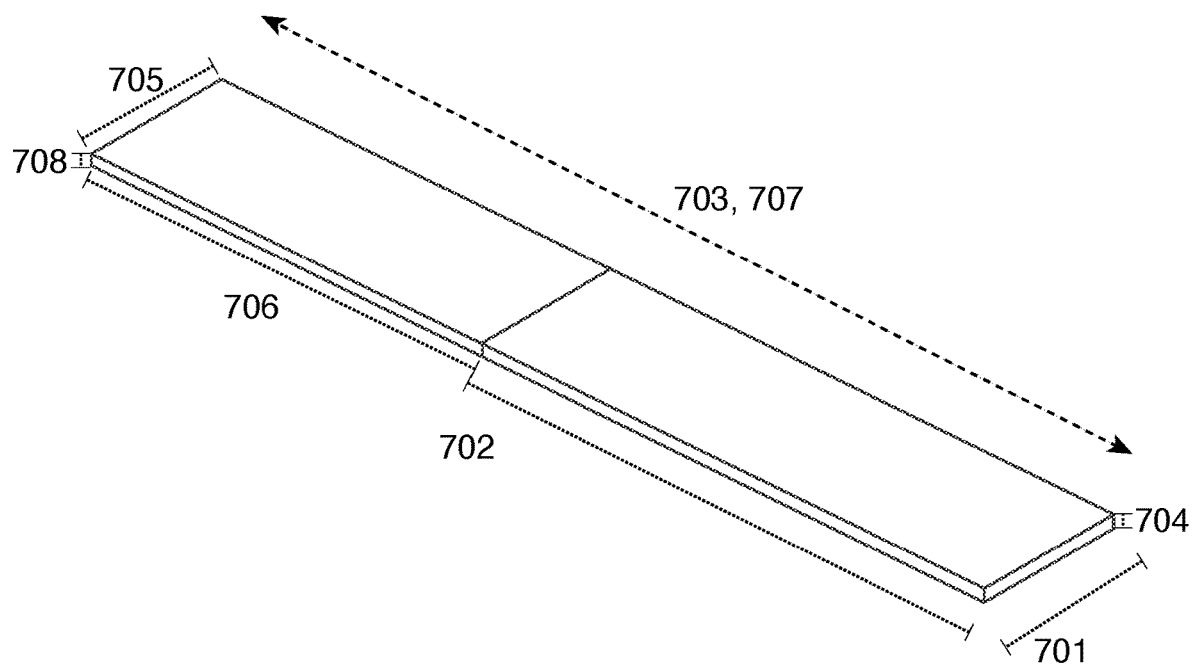
FIG. 7 is an illustration of the boards of the teeter fully extended, without the fulcrum assembly.
Figure 8:
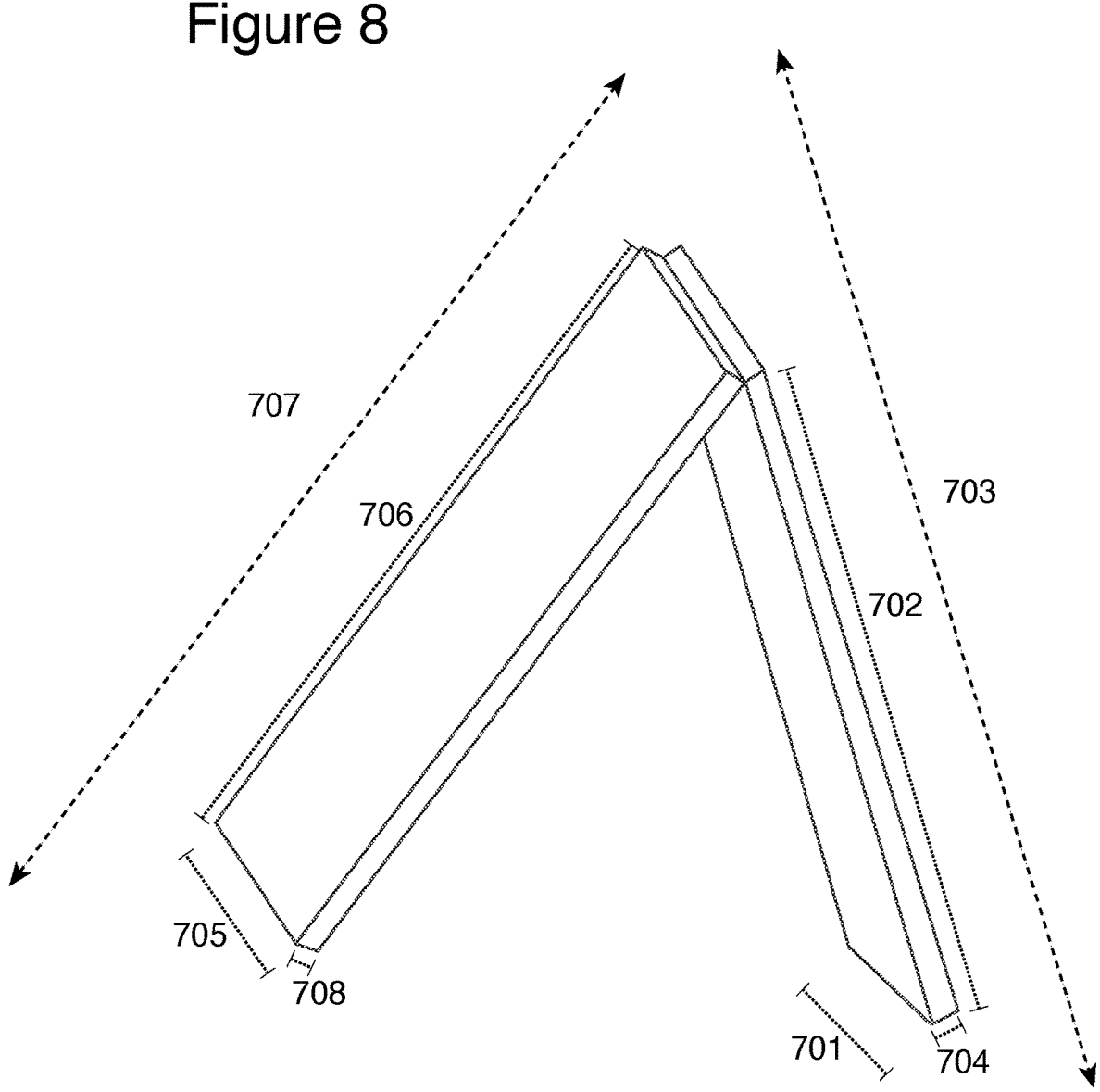
FIG. 8 is an illustration of the boards of the teeter partially closed, without the fulcrum assembly.

The axial portion of each support (e.g., 504) has a hole for a bolt (see 502). A first support is attached to the first board such that the center of the hole on the axial portion is parallel to the proximal edge of the board. The first support of the second board is similarly attached. When the first and second boards are placed together, the paired first supports overlap such that a bolt can pass through both said holes forming a hinge (505) with an axis (405). In use, the bolt also passes through one hole of each the first and second leg. The first and second boards and the first and second legs may rotate along the hinge. In this manner, the boards may rotate with respect to each other from a position in which the underside of the first and of the second board abut (see FIG. 6), to a position in which the longitudinal axes of the boards are one (see FIGS. 1 and 2). In a most preferred embodiment, the first leg and the second leg are attached via a stabilizer (e.g., 304), which, when engaged, prevents the legs from moving in relation to each other.

In most preferred embodiments, the board locking system comprises a pair of two-member attachment means such as sliding latches. In a most highly preferred embodiment, the axial portion of the support of a board has a hole (e.g. 506) which corresponds to a movable bolt (e.g. 507) fastened to the underside of a board such the movable bolt can be moved to be within said hole to restrict movement of the board. When each of the pair of two-member attachment means are engaged, both boards are unable to move along the axis of the hinge.

One would normally have the disclosed teeter in the folded, or closed conformation (the underside of the first and of the second boards face each other) for storage or transport. When needed, the teeter is placed into an open conformation by rotating the boards along the axis of the hinge until the proximal edge of the first board and the proximal edge of the second board are touching or nearly touching and the longitudinal axis of the first board and the longitudinal axis of the second board are parallel. The boards are fixed into position by the operation of the board locking system. The legs of the fulcrum assembly are moved into position and fixed in position to each other by engaging the stabilizer. Finally, the tetter is flipped so the top sides of the boards are facing away up and the bottom side of the boards is facing down. Due to the mass imbalance between the first and the second board, the platform naturally rotates along the axis of the hinge so the distal edge of the first board is down and the distal edge of the second board is up (the first position). A dog walks up the platform and crosses the axis of the hinge, which causes the teeter to move into a second position (FIG. 2) where the distal edge of the first board Is up and the distal edge of the second board is down. After the dog leaves the second board, the teeter moves again to the first position. The speed by which the teeter moves to the first position from the second position may be adjusted by adding or removing mass from the first or second boards.

The claims defining the invention are:

1. A dog agility teeter comprising a fulcrum-assembly, a first board and a second board;
    said fulcrum-assembly comprising a first leg and a second leg, a first hinge, and a second hinge;
        said first hinge and said second hinge being aligned and having a single axis;
    said first board comprising a mass, a topside, an underside, a longitudinal axis, a proximal edge, and a distal edge;
        said board being attached to the first and the second hinge of the fulcrum-assembly near the proximal edge of the board;
    said second board comprising a mass, a topside, an underside, a longitudinal axis, a proximal edge, and a distal edge;
        said board being attached to the first and the second hinge of the fulcrum assembly near the proximal edge of the board;
    said first board having a mass greater than the mass of the second board; and
    said first board and said second board rotationally connected to each other via the first and the second hinge of the fulcrum assembly;
    said dog agility teeter further comprises a closed conformation and an open conformation;
    said closed conformation being in which the underside of the first board is facing the underside of the second board; and
    said open conformation being in which the longitudinal axis of the first board and the longitudinal axis of the second board are parallel.

2. A method of using a dog agility teeter, said teeter comprising a fulcrum-assembly, a first board and a second board;
    said fulcrum-assembly comprising a first leg and a second leg, a first hinge, and a second hinge;
    said first hinge and said second hinge being aligned and having a single axis;
    said first board comprising a mass, a topside, an underside, a longitudinal axis, a proximal edge, and a distal edge;
    said board being attached to the first and the second hinge of the fulcrum-assembly near the proximal edge of the board;
    said second board comprising a mass, a topside, an underside, a longitudinal axis, a proximal edge, and a distal edge;
    said board being attached to the first and the second hinge of the fulcrum assembly near the proximal edge of the board;
    said first board having a mass greater than the mass of the second board;
    said first board and said second board rotationally connected to each other via the first and the second hinge of the fulcrum assembly;
    said first leg and said second leg capable of forming an angle with a vertex located at the axis of the hinges;
    said fulcrum assembly further comprising a stabilizer which restricts movement of the first and second legs in relation to each other when said stabilizer is engaged;
    The first and the second board each further comprises a first member of a two member fastening system;
    The first and the second hinge each further comprises a second member of a two member fastening system, and
    said teeter further comprises a closed conformation and an open conformation;
    said closed conformation being in which the underside of the first board is facing the underside of the second board; and
    said open conformation being in which the longitudinal axis of the first board and the longitudinal axis of the second board are parallel;
    comprising the steps of
    moving the teeter from the closed conformation to the open conformation by moving the first board and the second board along the axis of the hinges until the longitudinal axis of each said board is parallel to the other;
    engaging the stabilizer between the first and the second legs of the fulcrum assembly;
    engaging each two-member fastening system;
    orienting the teeter such that the underside of each said board faces down;

having a dog move from the distal edge of the first board toward the distal edge of the second board.

* * * * *